US009858316B1

(12) United States Patent
Cronin et al.

(10) Patent No.: US 9,858,316 B1
(45) Date of Patent: *Jan. 2, 2018

(54) MOOD-BASED SETTINGS

(71) Applicant: Rich Media Ventures, LLC, Miami, FL (US)

(72) Inventors: John Cronin, Bonita Springs, FL (US); Neil Balthaser, Quebec (CA)

(73) Assignee: Rich Media Ventures, LLC, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/142,124

(22) Filed: Apr. 29, 2016

(51) Int. Cl.
*G06F 7/00* (2006.01)
*G06F 17/30* (2006.01)
*G06F 1/16* (2006.01)

(52) U.S. Cl.
CPC ........ *G06F 17/30528* (2013.01); *G06F 1/163* (2013.01); *G06F 17/3056* (2013.01); *G06F 17/30598* (2013.01)

(58) Field of Classification Search
None
See application file for complete search history.

(56) References Cited

U.S. PATENT DOCUMENTS

| 2002/0132616 | A1 | 9/2002 | Ross et al. | |
|---|---|---|---|---|
| 2005/0021420 | A1* | 1/2005 | Michelitsch | G06Q 30/02 707/736 |
| 2007/0094686 | A1* | 4/2007 | Kim et al. | G11B 27/105 725/45 |
| 2007/0162606 | A1* | 7/2007 | Chen et al. | H04L 67/18 709/227 |
| 2012/0124456 | A1 | 5/2012 | Perez | |
| 2013/0173526 | A1* | 7/2013 | Wong | H04N 21/458 706/54 |
| 2014/0143064 | A1* | 5/2014 | Tran | A61B 5/0022 705/14.66 |
| 2015/0066950 | A1 | 3/2015 | Tobe et al. | |
| 2015/0135077 | A1 | 5/2015 | Fuzell-Casey | |
| 2015/0181291 | A1 | 6/2015 | Wheatley | |
| 2016/0078353 | A1 | 3/2016 | Shen et al. | |

OTHER PUBLICATIONS

U.S. Appl. No. 15/142,129 Office Action dated Jul. 22, 2016.
U.S. Appl. No. 15/142,129 Final Office Action dated Jan. 11, 2017.

* cited by examiner

*Primary Examiner* — Tuan A Pham
(74) *Attorney, Agent, or Firm* — Polsinelli LLP

(57) ABSTRACT

The present invention includes systems and methods for providing mood-based settings. One or more mood descriptors may be received and associated with one or more items in a database. A user device may receive information regarding a user's current mood. The user device may modify user device function based on the user's current mood. The user device may provide to the user content associated with a mood descriptor that matches the user's current mood. The user device may block a call when the caller is associated with a mood descriptor that matches the user's current mood.

20 Claims, 10 Drawing Sheets

| Name 805 | Number 810 | Email 815 | Address 820 | Mood Data Automatically Decline Calls if Mood = 825 |
|---|---|---|---|---|
| Boss | 555-5555 | boss@work.com | 123 Town Rd, City | Romantic, Workout, Sleep |
| Friend | 555-5555 | friend@email.com | 321 Town St, City | Working, Romantic, Workout, Sleep |
| Wife | 555-5555 | wife@family.com | 212 Street Rd, City | Angry, Working |

| Name 855 | Type 860 | File 865 | Size 870 | Mood Data Suggest Content if Mood = 875 |
|---|---|---|---|---|
| Song1 | Music | song1.mp3 | 3 MB | Happy, Excited, Workout |
| Movie1 | Video | Movie1.mov | 25 MB | Sad, Angry, Bored |
| Song2 | Music | song2.mp3 | 4 MB | Thinking, Relaxed, Reading |
| Lovesong | Music | song3.mp3 | 4 MB | Romantic |

FIG. 8B

MOOD-BASED SETTINGS

BACKGROUND OF THE INVENTION

1. Field of the Invention

The present invention relates generally to user device settings. More specifically, the present invention relates to modifying user device function based on mood-based settings.

2. Description of the Related Art

User devices currently provide a variety of options for user device functions. A user can adjust audio settings and display settings. A user may select an option such as a do-not-disturb option and turn off audio notifications. A user may receive recommendations for content based on the user's viewing history. A user may also receive recommendations for content based on the user's search history.

It is difficult, however, to modify user device function based on a user's current mood. User device settings for one mood may vary greatly from user device settings for a different mood. A user, for example, may not desire phone calls from a list of contacts during one mood, but desire phone calls from only some contacts in the list during a different mood. Because a user's mood may change frequently, it is difficult to make nuanced changes that fit the user's changing moods.

There is a need in the art for improved systems and methods for providing mood-based settings.

SUMMARY OF THE CLAIMED INVENTION

One exemplary method for providing mood-based settings describes receiving one or more mood inputs for association with one or more items in a database. The method also describes receiving user mood data at a user device. The mood data provides information about a current user mood. The method also describes executing instructions stored in memory. Execution of the instructions by the processor associates the one or more mood inputs with the one or more items in the database; identifies an item when at least one associated mood matches the current user mood; and modifies user device function in relation to one or more identified items.

One exemplary system for providing mood-based settings provides a communication interface, a user device, and a processor. The communication interface receives one or more mood inputs for association with one or more items in a database. The user device receives user mood data. The mood data provides information about a current user mood. Execution of instructions stored in the memory by the processor performs a set of operations. The operations include associating the one or more mood inputs with the one or more items in the database. The operations also include identifying an item when at least one associated mood matches the current user mood. The operations also include modifying user device function in relation to one or more identified items.

One exemplary non-transitory computer-readable storage medium is also described, the non-transitory computer-readable storage medium having embodied thereon a program executable by a processor to perform an exemplary method for providing mood-based settings. The exemplary program method describes receiving one or more mood inputs for association with one or more items. The program method also describes receiving user mood data at a user device. The mood data provides information about a current user mood. The program method also describes associating the one or more mood inputs with the one or more items. The program method also describes identifying an item when at least one associated mood matches the current user mood. The program method also describes modifying user device function in relation to one or more identified items.

BRIEF DESCRIPTION OF THE DRAWINGS

FIG. 3 illustrates a workflow, presented as a swimlane diagram, for providing mood-based information using a user device.

FIG. 8A illustrates the contact database.

FIG. 8B illustrates the content database.

DETAILED DESCRIPTION

The present invention includes systems and methods for providing mood-based settings. One or more mood descriptors may be received and associated with one or more items in a database. A user device may receive information regarding a user's current mood. The user device may modify user device function based on the user's current mood. The user device may provide to the user content associated with a mood descriptor that matches the user's current mood. The user device may block a call when the caller is associated with a mood descriptor that matches the user's current mood.

Rich media, as used in the present disclosure, refers to content that includes not only text (i.e. words) or images (i.e. pictures) to convey information to the user. Rather, rich media utilizes a variety of advanced features such as video and audio that encourages viewers to interact and engage with the content being viewed. The content discussed herein may include a variety of rich media, as well as traditional audio or video content.

Figure 1:
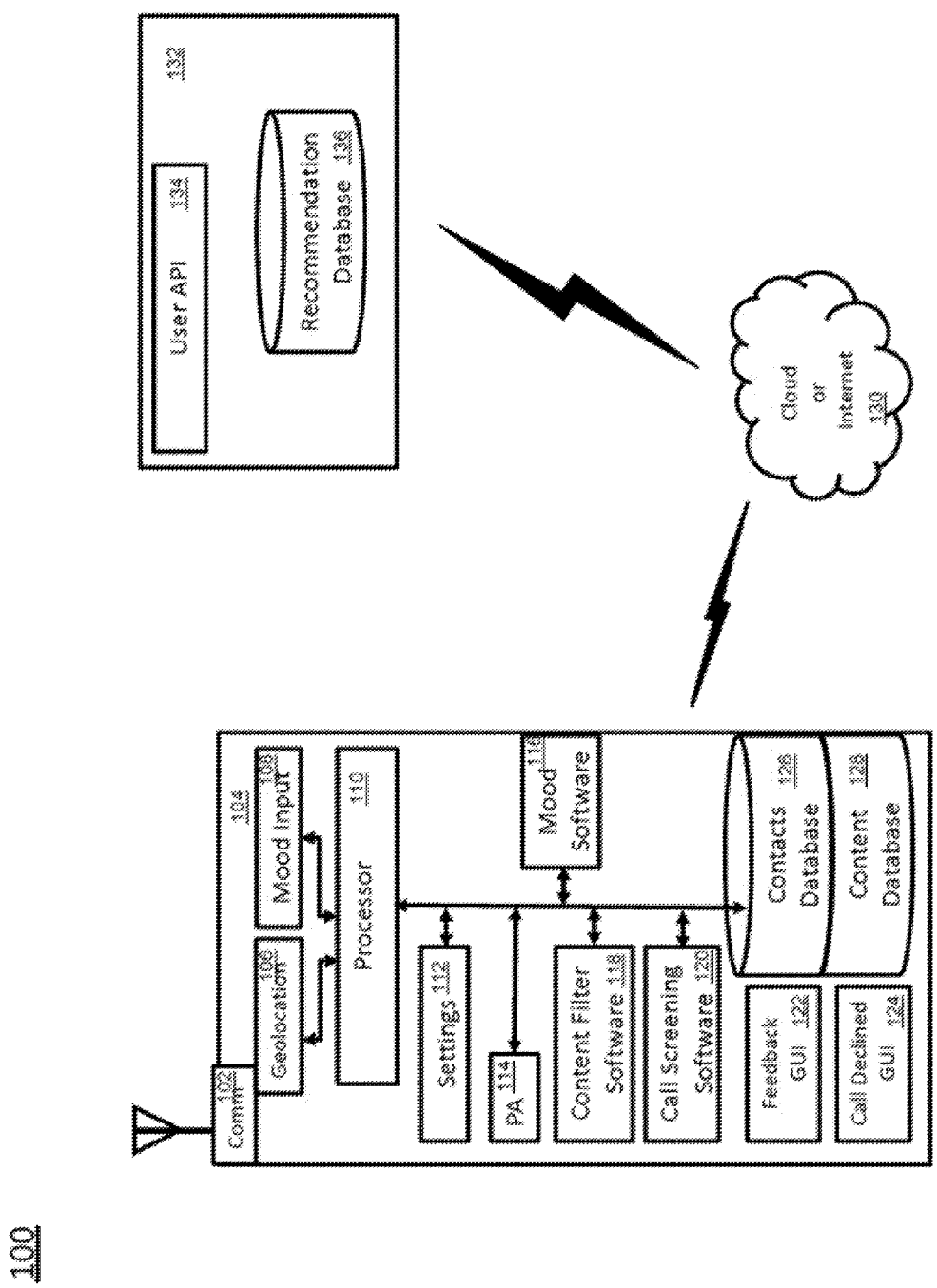
FIG. 1 illustrates an environment in which a system for providing mood-based settings may be implemented.

FIG. 1 illustrates an environment 100 in which a system for providing mood-based settings may be implemented. The environment 100 of FIG. 1 may include a user device 104, a communication network 130 and a third-party service 132 (e.g., Yelp, Google). The user device 104 may include a communication subsystem 102, a geolocation subsystem 106, a mood input subsystem 108, a processor 110, a settings subsystem 112, and a mood software 116. The communication subsystem 102 may include one or more wireless communication units. The communication subsystem 102 may include an antenna. The user device 104 may also include a personal assistant subsystem 114, a content filter software 118, a call screening software 120, a feedback GUI subsystem 122, a call declined GUI subsystem 124, a contacts database 126, and a content database 128. The third-party service 132 may include a user application programming interface (API) 134 and a recommendation database 136.

The user device 104 and third-party service 132 may communicate via the communication network 130. The user device 104 may communicate through the communication network 130 using the communication subsystem 102. The communication subsystem 102 may communicate using one or more wireless communication units. The communication subsystem 102 may communicate using the antenna.

The geolocation subsystem 106 may provide location information using a Global Positioning System (GPS). The mood input subsystem 108 may provide mood information generated from input received from one or more wearable devices. The mood input system 108 may also provide mood information generated from input received from the user device 104. The settings subsystem 112 may provide user device settings to the user for selection. The settings subsystem 112 may also provide one or more mood settings to the user for selection. The processor 110 may be used to run the user device 104. The user device 104 may include memory used to store instructions and data for execution by the processor 110.

The mood software 116 may provide a mood input GUI. A user may provide current mood information using the mood input GUI. The mood software 116 may also provide mood information received from the mood input subsystem to the personal assistant subsystem 114, the content filter software 118, the call screening software 120, the feedback GUI subsystem 122, the call declined GUI subsystem 124, the contacts database 126, and the content database 128. The content filter software 118 may access and edit information in the content database 128. The call screening software 120 may access and edit information in the contacts database. The personal assistant subsystem 114 may communicate with the third-party service 132.

The third-party service 132 may be a provider such as Yelp or Google. The recommendation database 136 may be a database of information. The database 136 may include information about businesses, events, people, products, geographic locations, or combinations thereof.

Figure 2:
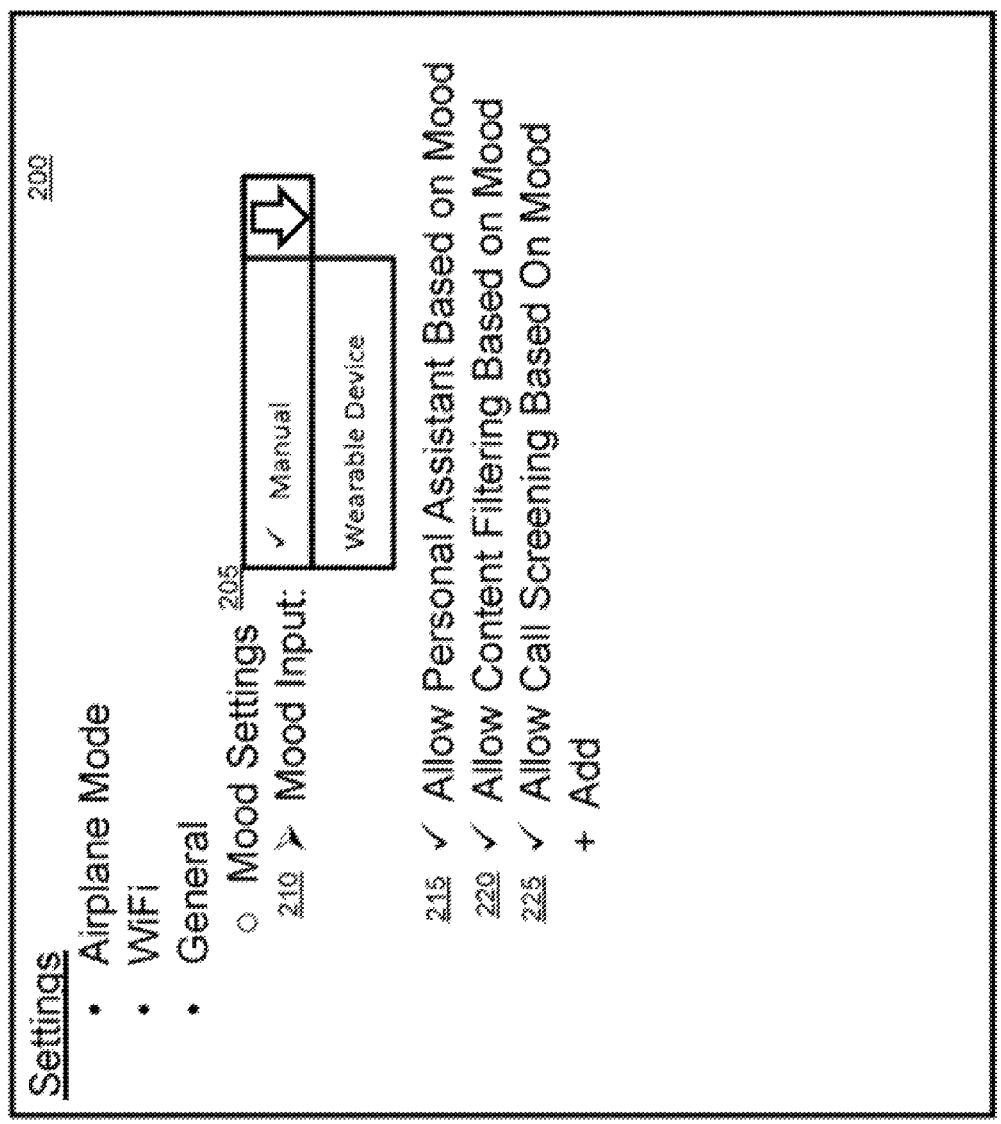
FIG. 2 illustrates a settings graphical user interface (GUI).

FIG. 2 illustrates a settings graphical user interface (GUI) 200. The settings GUI of FIG. 2 may include one or more mood settings 205. The one or more mood settings 205 may include a mood input option 210. The one or more mood settings 205 may also include an allow personal assistant based on mood option 215, an allow content filtering based on mood 220, and an allow call screening based on mood 225. The settings GUI 200 may be integrated into a settings menu of the user device 104.

A user may use the mood input option 210 to control the means through which mood information is provided to the user device 104. The user may use the mood input option 210 to select a manual option when the user desires to provide mood data through manual input. A user may provide manual input, for example by selecting the user's current mood from a mood input GUI.

The user may use the mood input option 210 to select a wearable device option when the user desires to provide mood data through one or more wearable devices. A wearable device may include one or more sensors. A sensor, for example, may be a biosensor. A wearable device may be communicatively connected to the user device 104. A wearable device, for example, may collect data about the user and transmit the data to the user device 104. The wearable device, for example, may process collected data about the user to determine the user's current mood and transmit the processed data to the user device 104.

The user may select the allow personal assistant based on mood option 215 to allow a personal assistant (e.g., SIRI®) to user mood information. The user may select the allow content filtering based on mood option 220 to allow the user device 104 to filter content based on user mood information. The user device 104 may filter content using the content filter software 118. The user may select the allow call screening based on mood option 225 to allow the user device 104 to decline calls based on user mood information. The user device 104 may decline calls using the call screening software 120. The user may add one or more additional mood settings through the settings GUI 200. The user device 104, for example, may use mood information for an additional feature when the user selects a corresponding additional mood setting.

Figure 3:
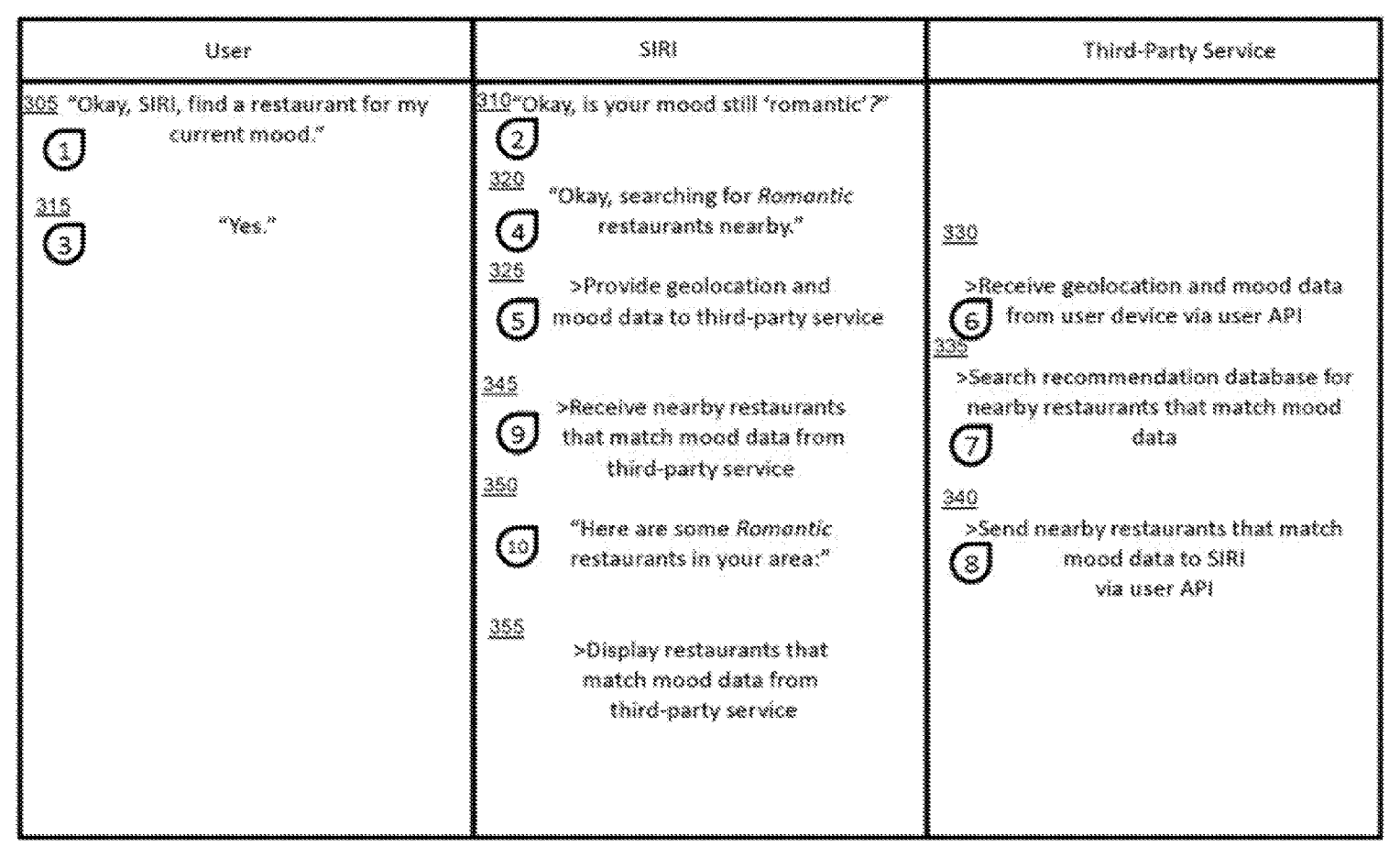

FIG. 3 illustrates a workflow 300, presented as a swim-lane diagram, for providing mood-based information using a user device 104. In the workflow 300 of FIG. 3, mood-based information may be provided using a personal assistant included in the user device 104. The personal assistant may be a voice-activated personal assistant such as the Apple iPhone's SIRED ("Siri"). In step 305, a user may provide a command to the user device 104. The user may provide a command, for example, by saying, "Okay, Siri, find a restaurant for my current mood."

In step 310, the user device 104 may optionally clarify the command. The user device 104 may clarify the command via audio output, visual output, or combinations, thereof. The user device 104, for example, may confirm the user's mood has not changed from a previous mood input. The user device 104, for example, may provide an audio output of "okay, is your mood still 'romantic?'"

In step 315, the user may optionally respond to clarify the command. The user, for example, may confirm the user's mood has not changed from the previous mood input by saying, "Yes."

In step 320, the user device 104 may provide output showing the received command. The user device 104 may show the receive command via audio output, visual output, or combinations, thereof. The user device 104, for example, may provide audio output of "okay, searching for 'romantic' restaurants near you." The output may allow the user to review the command and correct the command if an error is present in the command. The user, for example, may desire a "romantic" restaurant in a city different from the user's current location.

In step 325, the user device 104 may provide location information and mood information to the third-party service 132 (e.g., Yelp, Google).

In step 330, the third-party service 132 may receive location information and mood information from the user device 104 via the user API 134.

In step 335, the third-party service 132 may query the recommendation database 136 for one or more recommendations which meet requirements included in the user command. The third-party service 132, for example, may perform a search of the recommendation database 136 to identify one or more "romantic" restaurants located near the user's current location.

In step 340, the third-party service 132 may provide to the user device 104 one or more recommendations which meet the user's requirements. The third-party service 132 may provide the one or more recommendations via the user API 134. The third-party service 132, for example, may provide one or more restaurant recommendations, wherein each of the one or more restaurants are "romantic" and are located near the user's current location.

In step 345, the user device 104 may receive from the third-party service 132 the one or more recommendations which meet the user's requirements. The user device 104, for example, may receive one or more restaurant recommendations, wherein each of the one or more restaurants are "romantic" and are located near the user's current location.

In step 350, the user device 104 may provide to the user the one or more received recommendations. The user device 104 may provide the one or more recommendations via audio output, visual output, or combinations, thereof. The user device 104, for example, may provide an audio output of "here are some 'romantic' restaurants in your area"; and a visual output of "here are some 'romantic' restaurants in your area:" wherein the one or more received recommendations are also listed in the visual output.

Figure 4:
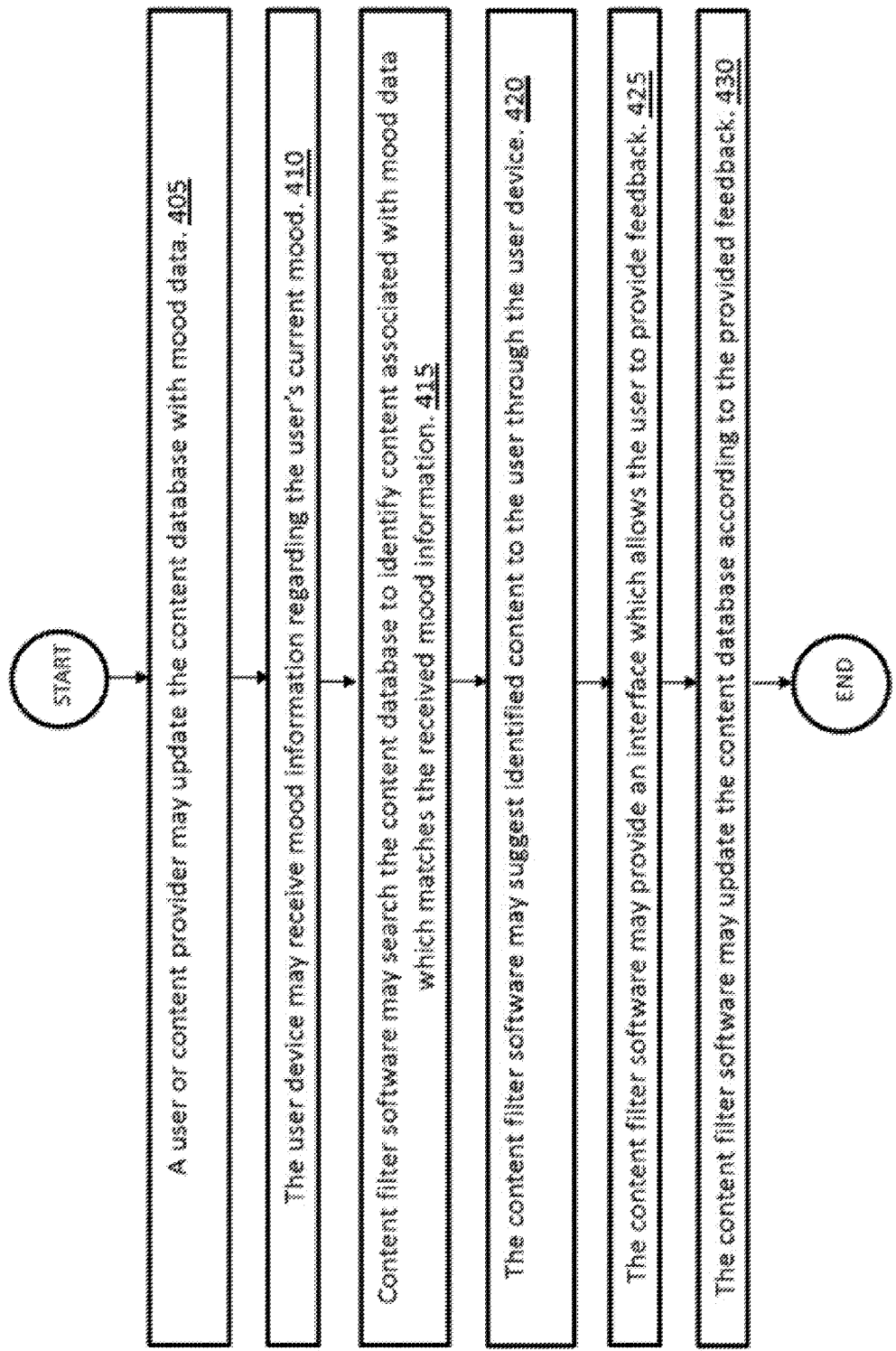
FIG. 4 illustrates a workflow for filtering content based on mood information.

FIG. 4 illustrates a workflow 400 for filtering content based on mood information. In step 405 of FIG. 4, a user or content provider may update the content database 128 with mood data. A user may add "happy" to mood data associated with a song, for example, when the user finds the song to be happy. The content filter software 118 may provide an interface for updating the content database 128 with mood data.

In step 410, the user device 104 may receive mood information regarding the user's current mood. Mood information, for example, may indicate that the user's current mood is "happy."

In step 415, content filter software 118 may search the content database 128 to identify content associated with mood data which matches the received mood information. The content filter software 118 may identify music associated with mood data which includes "happy," for example, when mood information indicates that the user's current mood is "happy."

In step 420, the content filter software 118 may suggest identified content to the user through the user device 104. The content filter software 118, for example, may display through the user device 104 a music playlist of "happy" songs.

In step 425, the content filter software 118 may provide an interface which allows the user to provide feedback. The interface may be the feedback graphical user interface (GUI) 705. The user may use the interface to provide feedback regarding the suggested content. The user, for example, may make a selection to indicate a song is not a "happy" song.

In step 430, the content filter software 118 may update the content database 128 according to the provided feedback. The content filter software 118, for example, may remove "happy" from mood data associated with the corresponding song. The content filter software 118 may also strengthen or weaken an association between content and mood data.

Figure 5:
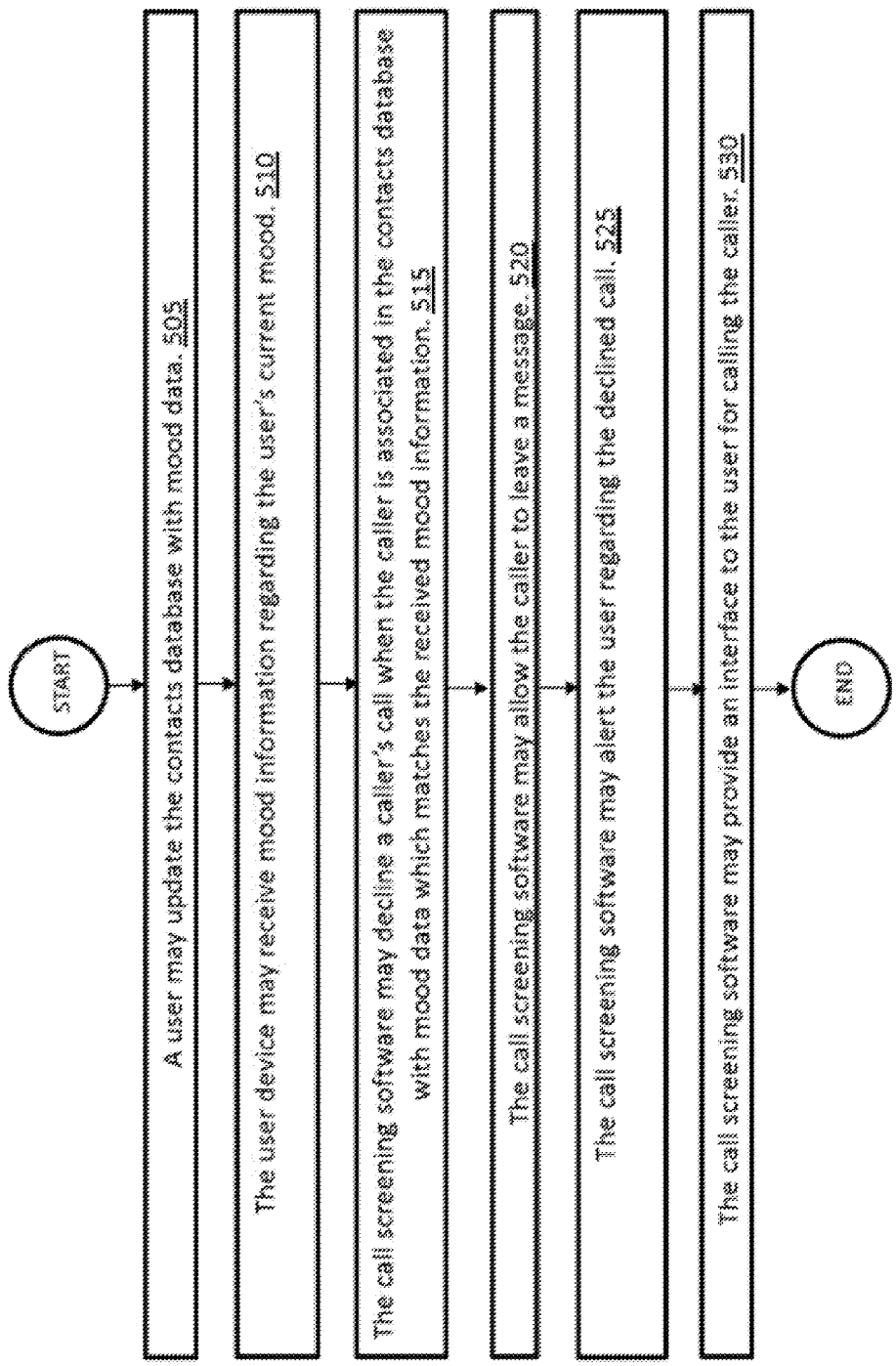
FIG. 5 illustrates a workflow for screening calls based on mood information.

FIG. 5 illustrates a workflow 500 for screening calls based on mood information. In step 505 of FIG. 5, a user may update the contacts database 126 with mood data. A user may add "romantic" to mood data associated with a contact, for example, to decline a call from the contact when the user's mood is "romantic." The call screening software 120 may provide an interface for updating the contact database 126 with mood data.

In step 510, the user device 104 may receive mood information regarding the user's current mood. Mood information, for example, may indicate that the user's current mood is "romantic."

In step 515, the call screening software 120 may decline a caller's call when the caller is associated in the contacts database 126 with mood data which matches the received mood information. The call screening software 120 may decline a call when the caller is associated with mood data which includes "romantic," for example, when mood information indicates that the user's current mood is "romantic."

In step 520, the call screening software 120 may allow the caller to leave a message. The message may be a text message or a voicemail.

In step 525, the call screening software 120 may alert the user regarding the declined call. The call screening software 120 may alert the user using a call-declined GUI. The call screening software 120 may identify the caller for the user.

In step 530, the call screening software 120 may provide an interface to the user for calling the caller. Such an interface may be included in the call-declined GUI. The interface may include a button which a user may select to call the caller.

Figure 6:
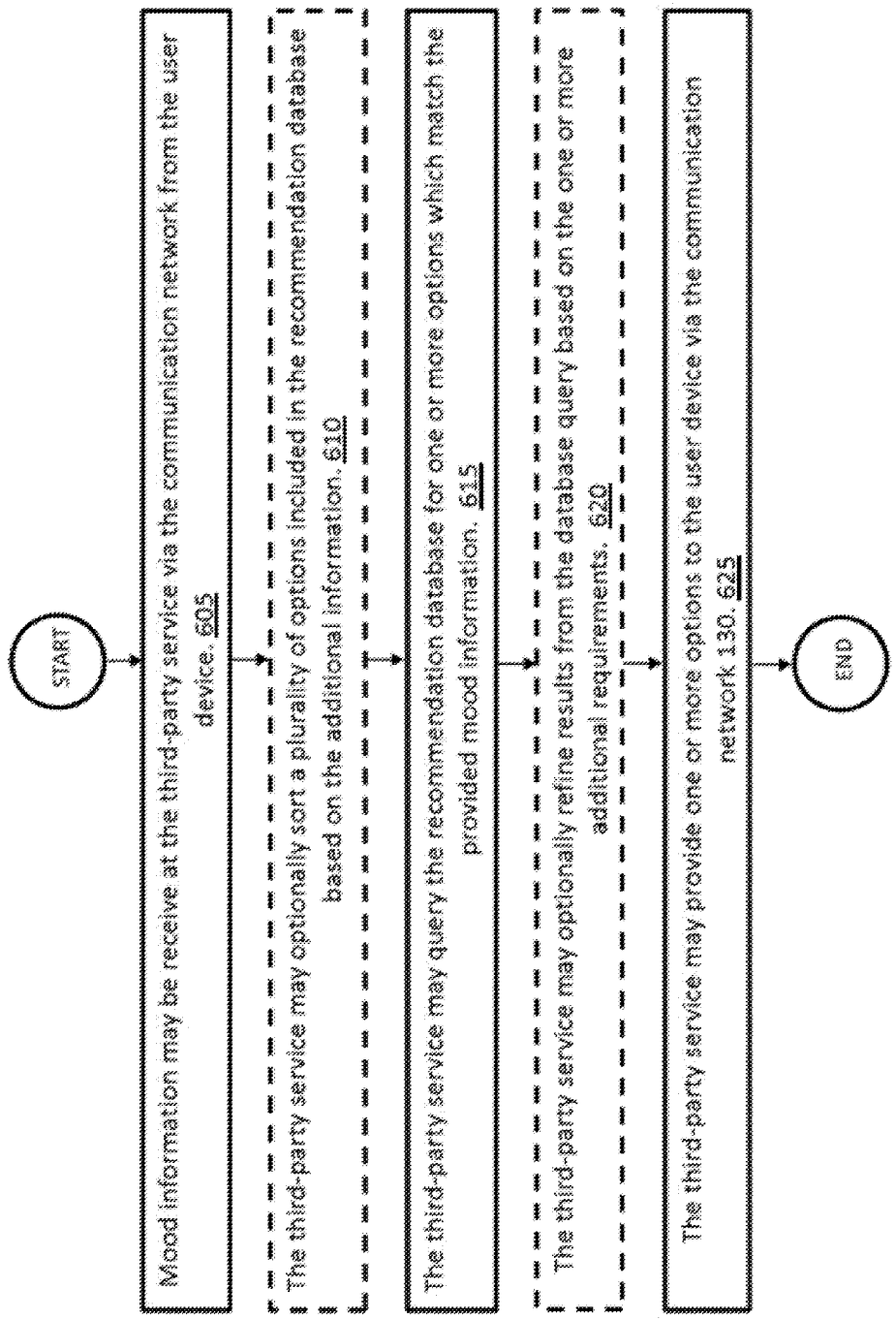
FIG. 6 illustrates a workflow for providing mood-based information through the user application programming interface.

FIG. 6 illustrates a workflow 600 for providing mood-based information through the user API 134. In step 605 of FIG. 6, mood information may be receive at the third-party service 132 via the communication network 130 from the user device 104. Mood information may be received at the third-party service via the user API 134. Additional information may also be received from the user device 104. Additional information may include one or more additional requirements. An additional requirement, for example, may be a requirement that a recommendation be located within a predetermined distance from a user's current location. Additional information may include location information.

In step 610, the third-party service 132 may optionally sort a plurality of options included in the recommendation database 136 based on the additional information. The third-party service 132 may sort a plurality of restaurant options based on distance from the user's current location, for example, when an additional requirement requires that a recommendation be located within a predetermined distance from a user's current location.

In step 615, the third-party service 132 may query the recommendation database 136 for one or more options which match the provided mood information. The third-party service 132 may search the recommendation database 136 for one or more restaurant options, wherein each of the one or more restaurant options may be associated with a "romantic" mood, for example, when the user desires one or more recommendations for "romantic" restaurants.

In step 620, the third-party service 132 may optionally refine results from the database query based on the one or more additional requirements. The third-party service 132 may narrow results to five restaurant options, wherein the restaurants may be the five restaurants closest to the user's current location, for example, when proximity is an additional requirement. In step 625, the third-party service 132 may provide one or more options to the user device 104 via the communication network 130.

Figure 7C:
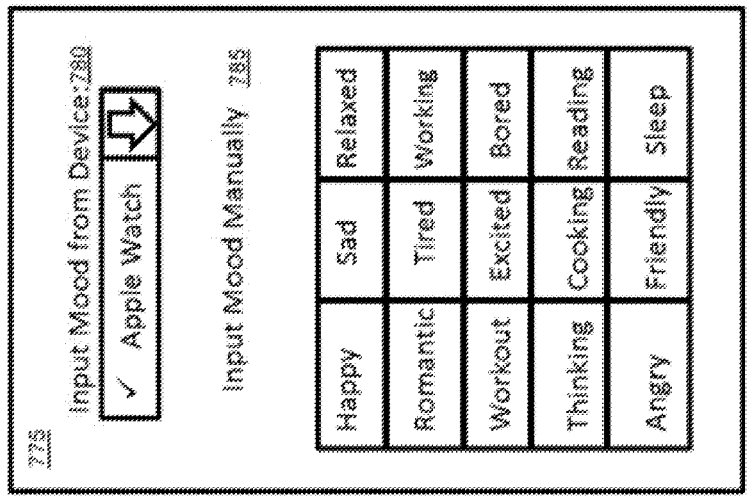
FIG. 7C illustrates a mood input graphical user interface (GUI).
Figure 7B:
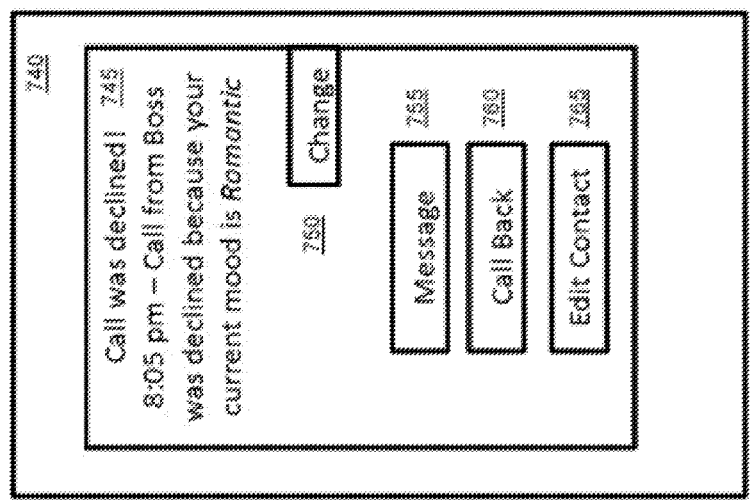
FIG. 7B illustrates a call-declined graphical user interface (GUI).
Figure 7A:
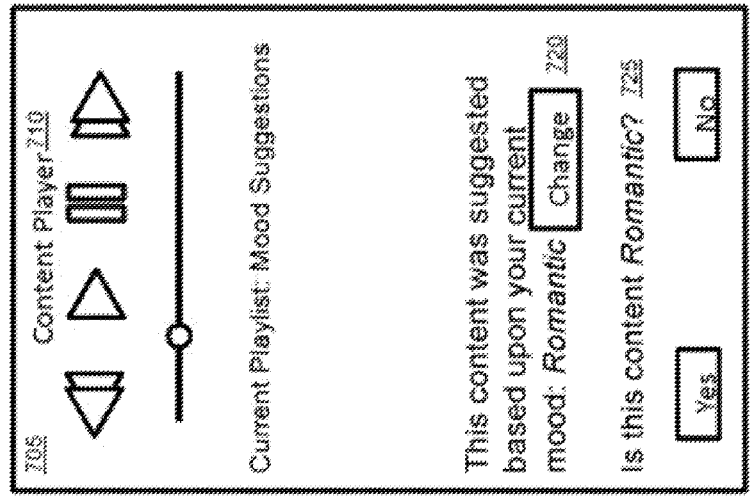
FIG. 7A illustrates a feedback graphical user interface (GUI).

FIG. 7A illustrates a feedback graphical user interface (GUI) 705. The feedback GUI 705 of FIG. 7A may include a content section 710, a mood section 720, and a feedback section 725. The feedback GUI 705 may be displayed by the user device 104 when a user requests content from the user device 104. Such content may include music, video, or images. The feedback GUI 705, for example, may include a music player or a video player. The content filter software 118 may provide content for the feedback GUI 705 according to the user's current mood.

The content section 710 may include content provided in response to a user request. The content section 710 may display a current playlist, for example, when a user opens a music player from the user device 104. The content section 710 may include an interface for controlling content. The content section 710, for example, may include a rewind button, a play button, a pause button, and a fast-forward button for playing music. The content section 710 may include a content descriptor. A content descriptor may be "Current Playlist: Mood Suggestions," for example, when the user device 104 is playing a playlist of songs selected based on the user's current mood.

The mood section 720 may include mood information associated with the provided content. Mood information may be "This content was suggested based upon your current mood: Romantic," for example, when a music player is populated with a playlist of songs, wherein each song is associated with a mood data of "romantic." The mood section 720 may include a change button. A user may select the change button to update the user device 104 with an updated current mood. A mood input GUI may be displayed by the user device 104 when the user selects the change button. The user may select a current mood using the mood input GUI. The user may select the change button, for example, when the user's mood changed from "romantic" to "relaxed" ten minutes ago, but was not detected by the user device 104.

The feedback section 725 may include an interface through which a user may provide feedback regarding the current content. The interface may include a yes button. The interface may also include a no button. The interface may include a thumbs-up and a thumb-down button. The feedback section 725, for example, may include a yes button, a no button, and a message of "Is this content 'romantic'?" The user may provide feedback by selecting the yes button, for example, when the user agrees that the current playlist is "romantic." The content filter software 118 may use feedback to strengthen or weaken an association between the corresponding content and the respective mood. The content filter software 118 may strengthen the association between the current playlist and mood data of "romantic," for example, when the user selects the yes button.

FIG. 7B illustrates a call-declined graphical user interface (GUI) 740. The call declined GUI 740 of FIG. 7B may include a change button 750, a call back button 760, and an edit contact button 765. The call-declined GUI 740 may also include a message button 755. The call-declined GUI 740 may be displayed by the user device 104 when the user device 104 automatically declines a call based on the user's current mood. The user device 104, for example, may decline a call by sending the call to voicemail. The call screening software 120 may prevent a user device 104 from ringing when a call is declined. The call screening software 120 may provide content for the call-declined GUI 740. Such content may provide information to a user. The content, for example, may be "Call was declined! 8:05 pm—Call from Boss was declined because your current mood is 'romantic.'"

A user may select the change button 750 to update the user device 104 with an updated current mood. A mood input GUI may be displayed by the user device 104 when the user selects the change button 750. The user may select a current mood using the mood input GUI. The user may select the change button 750, for example, when the user's mood changed from "romantic" to "relaxed" ten minutes ago, but was not detected by the user device 104.

The call-declined GUI 740 may include the message button 755 when a caller leaves a message after the caller's call was declined. A user may select the message button 755 to review the message. The message may be a text message or an audio message. The user, for example, may access the user's voicemail by selecting the message button 755.

A user may select the call back button 760 to call the caller. The user device 104, for example, may call the caller's mobile phone when the user selects the call back button 760. A user may select the edit contact button 765 to edit mood data associated with the caller in the contacts database 126. The user may remove "romantic" from mood data associated with a contact, for example, because the user may not wish to decline calls from the contact.

FIG. 7C illustrates a mood input graphical user interface (GUI) 775. The mood input GUI 775 of FIG. 7C may include an input-mood-from-device section 780 and an input-mood-manually section 785. The mood input GUI 775 may be accessed through the user device 104. The mood input GUI 775 may be provided by the mood software 116.

The input-mood-from-device section 780 may allow a user to select one or more devices through which mood information may be provided. The input-mood-from-device section 780 may include a drop-down menu of one or more devices for selection. The one or more devices may include the user device 104. Each of the one or more devices may be communicatively connected to the user device 104. A user who desires to provide mood information through one or more device sensors, for example, may select the corresponding device from the drop-down menu. A device may derive mood information from sensor data, user input, or facial analysis. A device, for example, may include a plurality of biosensors. A device, for example, may process text messages to conclude that the user is in a "happy" mood. A device, for example, may process social media input provided by the user to conclude that the user is in a "happy" mood. The input-mood-manually section 785 may allow a user to provide mood information by selecting a current mood.

FIG. 8A illustrates the contact database 126. The contact database 126 of FIG. 8A may include a contact name column 805, a number column 810, an email column 815, an address column 820, and a mood data column 825. In other embodiments, more columns, or fewer columns, may be included.

One or more contact identifications may be entered into the contact name column 805. Each of the one or more contact identification entries may be associated with one or more phone numbers, one or more emails, one or more addresses, and mood data. A contact identification, for example, may be a name of a person, may be a nickname, or may describe a relationship between the user and contact. The number column 810 may include one or more phone numbers associated with the respective contact identification. The email column 815 may include one or more emails associated with the respective contact. The address column 820 may include one or more addresses associated with the respective contact. The mood data column 825 may include mood data associated with the respective contact. Mood data may include one or more moods. A mood, for example, may be "happy."

FIG. 8B illustrates the content database 128. The content database 128 of FIG. 8B may include a content name column 855, a type column 860, a file column 865, a size column 870, and a mood data column 875. In other embodiments, more columns, or fewer columns, may be included.

One or more content identifications may be entered into the content name column 855. Each of the one or more content identification entries may be associated with a content type, a file name, a size, and mood data. A content identification, for example, may be a name of a song. The type column 860 may include a content type associated with the respective content identification. A content type for a song, for example, may be "Music." The file column 865 may include a file associated with the respective content identification. A file for a song, for example, may be "song1.mp3." The size column 870 may include a size of the file in the respective file column 865. The content database 128 may include "song1.mp3" in the file column 865 and "3 MB" in the size column 870, for example, when a file named "song1.mp3" is a size of 3 MB. The mood data column 875 may include mood data associated with the respective content identification. Mood data may include one or more moods. A mood, for example, may be "happy."

Figure 9:
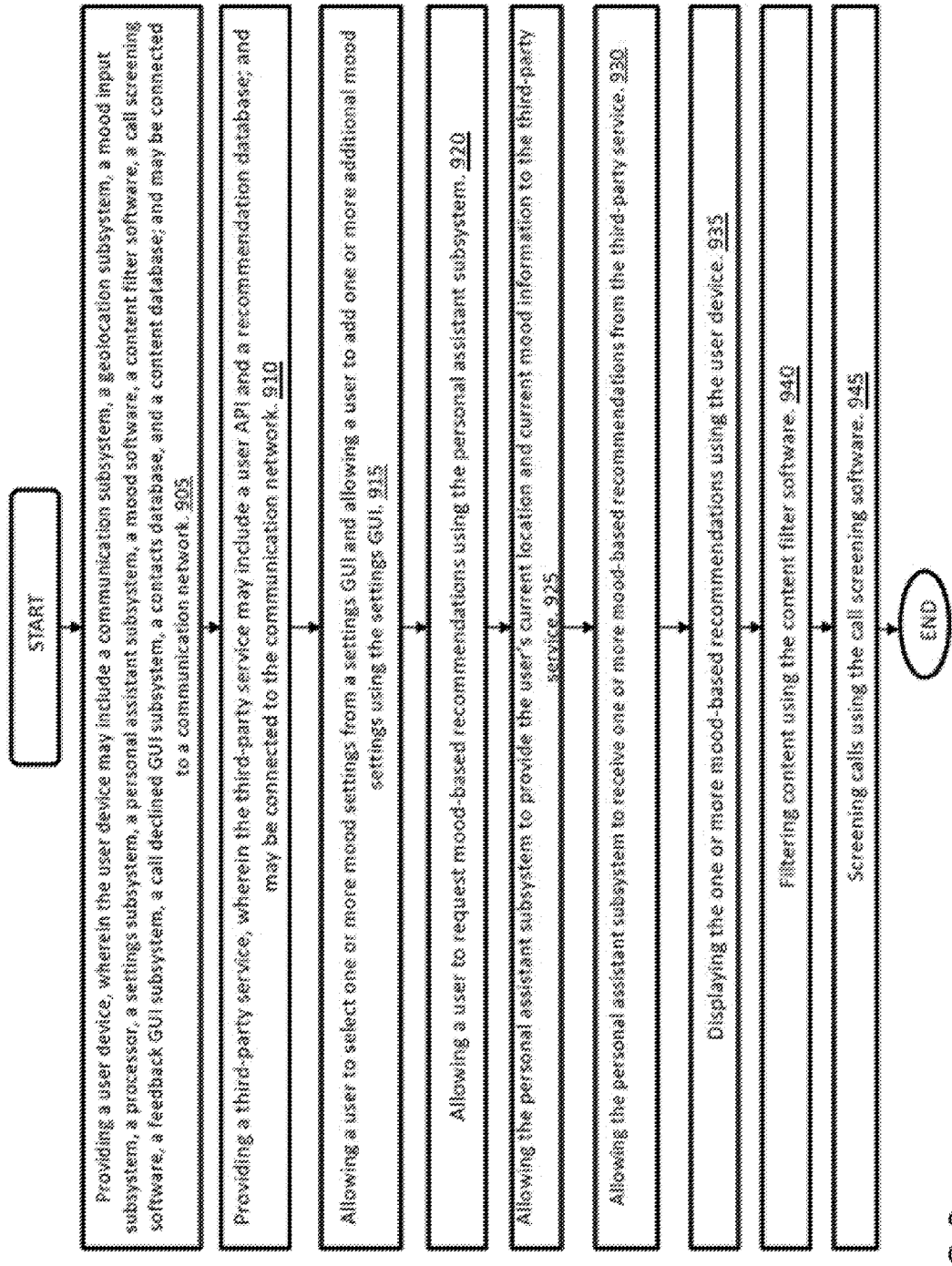
FIG. 9 illustrates a method for providing mood-based functions for a user device.

FIG. 9 illustrates a method 900 for providing mood-based functions for a user device. The method 900 of FIG. 9 may include, at block 905, providing a user device 104, wherein the user device 104 may include a communication subsystem 102, a geolocation subsystem 106, a mood input subsystem 108, a processor 110, a settings subsystem 112, a personal assistant subsystem 114, a mood software 116, a content filter software 118, a call screening software 120, a feedback GUI subsystem 122, a call declined GUI subsystem 124, a contacts database 126, and a content database 128; and may be connected to a communication network 130.

The method 900 may include, at block 910, providing a third-party service 132, wherein the third-party service 132 may include a user API 134 and a recommendation database 136; and may be connected to the communication network 120.

The method 900 may include, at block 915, allowing a user to select one or more mood settings from a settings GUI and allowing a user to add one or more additional mood settings using the settings GUI. The one or more mood settings may include a mood input option. The one or more mood settings may also include an allow personal assistant based on mood option, an allow content filtering based on mood, and an allow call screening based on mood.

The method 900 may include, at block 920, allowing a user to request mood-based recommendations using the personal assistant subsystem 114, wherein a response from the personal assistant may be based on the user's current mood.

The method 900 may include, at block 925, allowing the personal assistant subsystem 114 to provide the user's current location and current mood information to the third-party service 132. The current location and current mood information may be provided to the third-party service 132 via the user API 134.

The method 900 may include, at block 930, allowing the personal assistant subsystem 114 to receive one or more mood-based recommendations from the third-party service 132, wherein each of the recommendations matches the user's current mood and meets location requirements provided by the user.

The method 900 may include, at block 935, displaying the one or more mood-based recommendations using the user device 104.

The method 900 may include, at block 940, filtering content using the content filter software 118. The method 900 may include, at block 945, screening calls using the call screening software 120.

Figure 10:
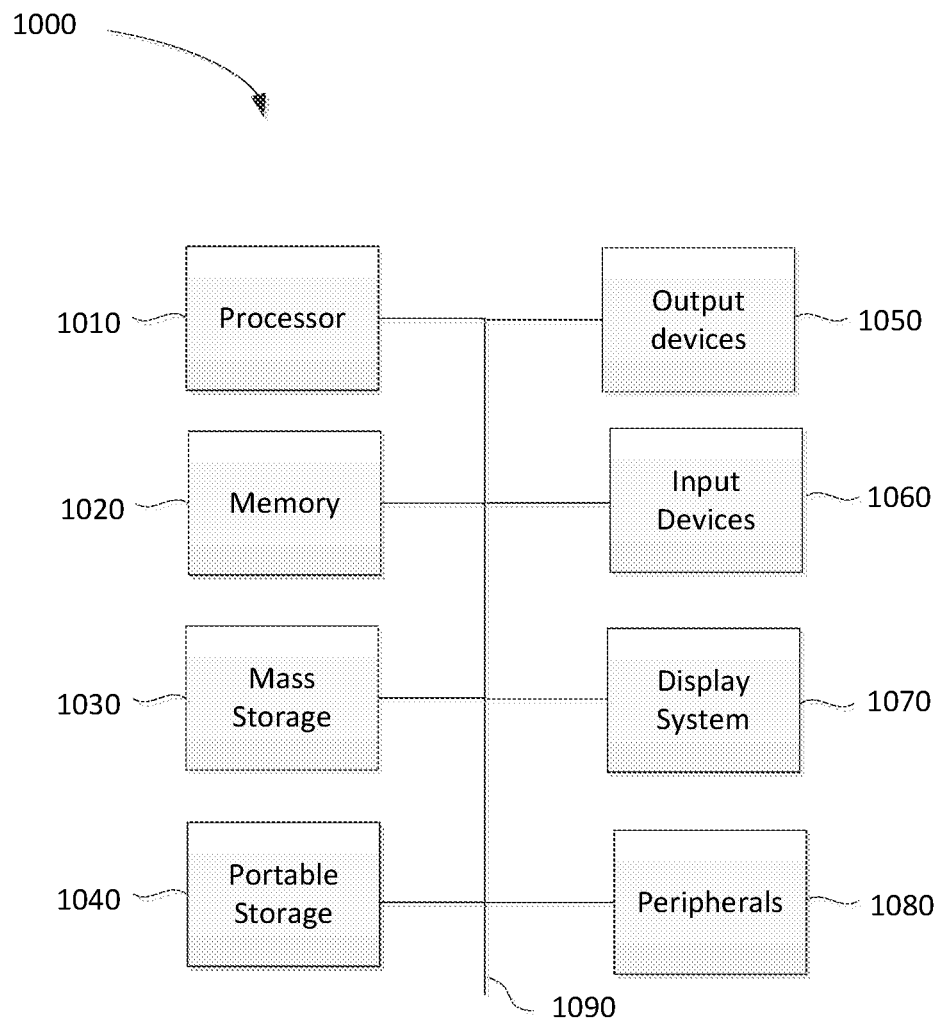
FIG. 10 is a block diagram of an exemplary computing device that may be used to implement an embodiment of the present invention.

FIG. 10 illustrates an exemplary computing system 1000 that may be used to implement an embodiment of the present invention. The computing system 1000 of FIG. 10 includes one or more processors 1010 and memory 1010. Main memory 1010 stores, in part, instructions and data for execution by processor 1010. Main memory 1010 can store the executable code when in operation. The system 1000 of FIG. 10 further includes a mass storage device 1030, portable storage medium drive(s) 1040, output devices 1050, user input devices 1060, a graphics display 1070, and peripheral devices 1080.

The components shown in FIG. 10 are depicted as being connected via a single bus 1090. However, the components may be connected through one or more data transport means. For example, processor unit 1010 and main memory 1010 may be connected via a local microprocessor bus, and the mass storage device 1030, peripheral device(s) 1080, portable storage device 1040, and display system 1070 may be connected via one or more input/output (I/O) buses.

Mass storage device 1030, which may be implemented with a magnetic disk drive or an optical disk drive, is a non-volatile storage device for storing data and instructions for use by processor unit 1010. Mass storage device 1030 can store the system software for implementing embodiments of the present invention for purposes of loading that software into main memory 1010.

Portable storage device 1040 operates in conjunction with a portable non-volatile storage medium, such as a floppy disk, compact disk or Digital video disc, to input and output data and code to and from the computer system 1000 of FIG. 10. The system software for implementing embodiments of the present invention may be stored on such a portable medium and input to the computer system 1000 via the portable storage device 1040.

Input devices 1060 provide a portion of a user interface. Input devices 1060 may include an alpha-numeric keypad, such as a keyboard, for inputting alpha-numeric and other information, or a pointing device, such as a mouse, a trackball, stylus, or cursor direction keys. Additionally, the system 1000 as shown in FIG. 10 includes output devices 1050. Examples of suitable output devices include speakers, printers, network interfaces, and monitors.

Display system 1070 may include a liquid crystal display (LCD) or other suitable display device. Display system 1070 receives textual and graphical information, and processes the information for output to the display device.

Peripherals 1080 may include any type of computer support device to add additional functionality to the computer system. For example, peripheral device(s) 1080 may include a modem or a router.

The components contained in the computer system 1000 of FIG. 10 are those typically found in computer systems that may be suitable for use with embodiments of the present invention and are intended to represent a broad category of such computer components that are well known in the art. Thus, the computer system 1000 of FIG. 10 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for providing mood-based settings, the method comprising:
receiving one or more mood inputs via a user interface of a user device for association with one or more contacts stored in a database, wherein each contact is associated with a set of one or more moods;
receiving user mood data at the user device via one or more biosensors, wherein the mood data provides information about a current user mood;
detecting a current location of the user device via a global positioning system (GPS);
receiving an indication that a caller is making a telephone call to the user device; and
executing instructions stored in memory, wherein execution of the instructions by the processor:
identifies that the caller matches one of the contacts stored in the database who is associated with an identified set of one or more moods,
evaluates the associated set of one or more moods and the current user mood to identify a match, and
modifies one or more user device functions based on the identified match between the current user mood and the associated set of one or more moods, wherein at least one of the modified user device functions comprise providing one or more recommendations corresponding to the identified match and the current location of the user device, and wherein the telephone call from the caller is filtered based on a profile specifying that telephone calls from the caller are to be filtered when the current user mood matches the associated set of one or more moods.

2. The method of claim 1, wherein the user mood data is received from a wearable device that includes the one or more biosensors.

3. The method of claim 1, wherein a content provider provides information regarding the mood inputs to the user interface.

4. The method of claim 1, wherein the user a selection regarding the mood inputs to the user interface.

5. The method of claim 1, wherein filtering the telephone call includes blocking the telephone call.

6. The method of claim 1, wherein modifying the user device functions includes playing content based on the identified match between the current user mood and the associated set of one or more moods.

7. The method of claim 1, further comprising receiving user input via a user interface regarding an updated user mood, wherein a subsequent telephone call from the caller is allowed to be connected.

8. The method of claim 7, further comprising requesting confirmation of the current user mood, and wherein the received user input regarding the updated user mood was responsive to the request for confirmation.

9. The method of claim 1, wherein the current location is associated with a mood.

10. A system for providing mood-based settings, the system comprising:

a user interface that receives one or more mood inputs for association with one or more contacts stored in a database, wherein each contact is associated with a set of one or more moods;
one or more biosensors that detects user mood data, wherein the mood data provides information about a current user mood,
a global positioning system (GPS) that detects a current location of the user device;
a communication interface that receives an indication that a caller is making an incoming telephone call; and
a processor that executes instructions stored in memory, wherein execution of the instructions by the processor:
identifies that the caller matches one of the contacts stored in the database who is associated with an identified set of one or more moods,
evaluates the associated set of one or more moods and the current user mood to identify a match, and
modifies one or more user device functions based on the identified match between the current user mood and the associated set of one or more moods, wherein at least one of the modified user device functions comprise providing one or more recommendations corresponding to the identified match and the current location of the user device, and wherein the incoming telephone call from the caller is filtered based on a profile specifying that telephone calls from the caller are to be filtered when the current user mood matches the associated set of one or more moods.

11. The system of claim 1, further comprising a wearable device comprising the one or more biosensors, wherein the user mood data is received from the wearable device.

12. The system of claim 1, wherein a content provider provides information regarding the mood inputs to the user interface.

13. The system of claim 1, wherein the user provides a selection regarding the mood inputs to the user interface.

14. The system of claim 1, wherein the processor filters the telephone call by blocking the telephone call.

15. The system of claim 1, wherein the processor modifies the user device functions by playing content based on the identified match between the current user mood and the associated set of one or more moods.

16. A non-transitory computer-readable storage medium having embodied thereon a program executable by a processor to perform a method for providing mood-based settings, the method comprising:
receiving one or more mood inputs via a user interface of a user device for association with one or more contacts stored in a database, wherein each contact is associated with a set of one or more moods;
receiving user mood data at the user device via one or more biosensors, wherein the mood data provides information about a current user mood;
detecting a current location of the user device via a global positioning system (GPS);
receiving an indication that a caller is making a telephone call to the user device;
identifying that the caller matches one of the contacts stored in the database who is associated with an identified set of one or more moods;
evaluating the associated set of one or more moods and the current user mood to identify a match; and
modifying one or more user device functions based on the identified match between the current user mood and the associated set of one or more moods, wherein at least one of the user device functions comprise providing one or more recommendations corresponding to the identified match and the current location of the user device, and wherein the telephone call from the caller is filtered based on a profile specifying that telephone calls from the caller are to be filtered when the current user mood matches the associated set of one or more moods.

17. The non-transitory computer-readable storage medium of claim 16, wherein a content provider provides information regarding the mood inputs to the user interface.

18. The non-transitory computer-readable storage medium of claim 16, wherein the user provides a selection regarding the mood inputs to the user interface.

19. The non-transitory computer-readable storage medium of claim 16, wherein filtering the telephone call comprises blocking the telephone call.

20. The non-transitory computer-readable storage medium of claim 16, wherein modifying the user device includes playing content based on the identified match between the current user mood and the associated set of one or more moods.

\* \* \* \* \*